Oct. 31, 1939.  W. DAWIHL ET AL  2,177,691
LUMINESCENT OR PHOSPHORESCENT BODY AND THE
PROCESS OF MANUFACTURING THE SAME
Filed June 25, 1936
Fig. 1
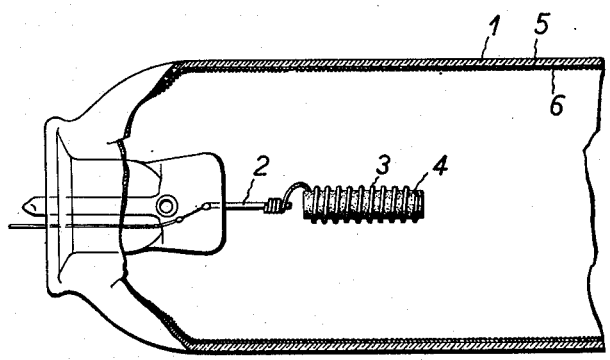
Fig. 2
Fig. 3
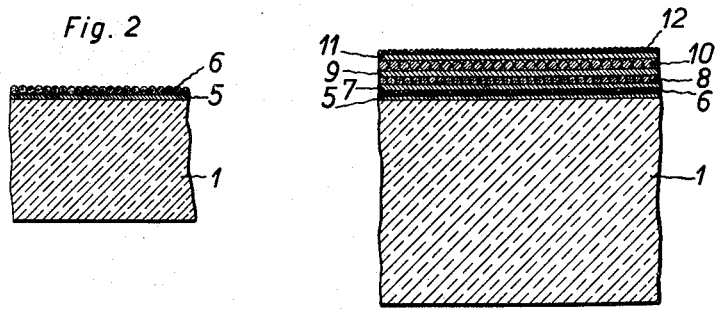
Inventors:
Walther Dawihl,
Otto Fritze,
Alfred Ruttenauer,
by Harry E. Dunham
Their Attorney.

Patented Oct. 31, 1939

2,177,691

UNITED STATES PATENT OFFICE 2,177,691

LUMINESCENT OR PHOSPHORESCENT BODY AND THE PROCESS OF MANUFACTURING THE SAME

Walther Dawihl, Berlin-Charlottenburg, Otto Fritze, Berlin, and Alfred Rüttenauer, Berlin-Halensee, Germany, assignors to General Electric Company, a corporation of New York Application June 25, 1936, Serial No. 87,294
In Germany June 28, 1935

20 Claims. (Cl. 176—122)

Our invention relates to improvements in luminescent or phosphorescent bodies and in the process of manufacturing the same. More particularly our invention relates to the method in which a luminous substance is applied to the surface of a body of glass or other suitable material by means of a binding medium. The object of the improvements is to provide a luminescent or phosphorescent body in which the luminous substance is applied to the body in a durable way. Another object of the improvements is to provide a luminescent or phosphorescent body in which the luminous mass is uniformly distributed all over the surface of the body, and in which therefore luminescence or phosphorescence is uniform. Finally an object of the improvements is to provide a body which has high luminescence. With these objects in view our invention consists in applying the luminous substance to the surface of the body by means of a binding medium which does not destroy the luminous body, and which enters into chemical reaction with the surface of the body thus providing an intermediate layer of the character of a cement. Where the body consists of glass we use an acid of an element of the fifth group of the periodic system, and more particularly phosphoric acid, arsenic acid and antimonic acid.

Our improved luminescent body may be used as the wall of electric discharge devices, particularly discharge lamps, in which case the luminous mass is applied to the inner surface of the said wall, and it may also be used as the body of a luminescent screen.

For the purpose of explaining the invention several examples of glass bodies having luminous mass applied thereto have been shown in the drawing, in which Fig. 1 is a fractional sectional elevation showing a part of a discharge receptacle, the luminous mass being illustrated in a diagrammatical way, Fig. 2 is a sectional elevation on an enlarged scale showing a part of the glass wall of the device shown in Fig. 1, and Fig. 3 is a similar sectional elevation showing a modification.

In the example shown in Fig. 1 the discharge device comprises a cylindrical container 1 of glass which has a filling of mercury vapour and a suitable noble gas, and which has leading in wires 2 sealed in its wall, the said leading in wires carrying electrodes 3 coiled around rods 4 made from material adapted to emit electrons, such as a sintered mixture of powdered tungsten and powdered barium oxide. The inner wall of the tube 1 has a coating 5 of a binding medium having powdered luminous mass 6 applied thereto.

The binding medium consists for example of phosphoric acid which may be applied either as a concentrated solution or a diluted solution in water or alcohol. We have found that any known phosphoric acid may be used, such as ortho- or metaphosphoric acid. The luminous mass consists of a suitable material in the form of powder such as zinc silicate, zinc sulfide, calcium wolframate, etc.

In carrying out the process we prefer first to apply a highly diluted solution of phosphoric acid to the surface of the body such as the inner surface of a discharge device or to the surface of a screen, to apply the powdered luminous mass to the said coating of phosphoric acid, and finally to dry the binding medium, drying being preferably accelerated by heating the glass surface. Thereby, at first, the solvent of the phosphoric acid such as alcohol or water is evaporated, while the particles of the zinc silicate or other luminous mass remain on the glutinous layer of the phosporic acid in their original positions, and finally, when the temperature is sufficiently high the layer of phosphoric acid left on the surface of the glass enters into chemical reaction with the said glass and hardens therewith into a transparent cement. After cooling the particles of zinc silicate are bound on the said hardened layer of phosphoric acid. A particularly effective luminescence is obtained when a 0.5 to 2.5% solution of water-free phosphoric acid in a water-free solvent such as methylalcohol or aceton is applied to the glass, in which case a uniform and exceedingly thin hardened layer of phosphoric acid is obtained in which most of the luminescent particles are partly embedded, while the said particles project from the coating with a large part of their surfaces, as is shown in Fig. 2. For many purposes this coating containing luminescent bodies sufficiently adheres to the glass, and practically the luminescent bodies are not chemically acted upon by the phosphoric acid. When however chemical reaction of the phosphoric acid with the luminescent bodies is to be safely avoided, and the said luminescent bodies are to be made particularly adherent to the glass by providing a somewhat thicker layer of phosphoric acid, zinc oxide or a similar substance is added to the phosphoric acid which is adapted to reduce the reaction of the phosphoric acid and the luminous substance. By such additions the tendency of the phosphoric acid to enter into reaction with the zinc which is ordinarily contained in the luminous substance is counteracted. The action of the zinc oxide added to the phosphoric acid is more mechanical than chemical and assists the formation of the intermediate layer composed of the phosphoric acid and glass. An action similar to that of the zinc oxide is obtained by kaolin.

Our process is advantageous for the further reason that the size of the particles of luminous mass which may be used in the process is practically unlimited, while in processes heretofore in use only particles of a limited size of the grains may be used.

A similar result as to the power of adherence of the luminous mass and the luminescence of the said luminous mass is obtained when acids other than phosphoric acid are used which are chemically related to the said phosphoric acid, and which belong to the same group of the periodic system, such as antimony and arsenic. These acids, the same as phosphoric acid, enter into chemical reaction with the glass after the luminescent bodies have been applied and the acids are dried at ordinary temperature or at elevated temperature, thus providing, by chemical reaction with the glass, a layer in the form of a cement to which the luminescent bodies are bound, the said luminescent bodies being safely bound to the surface of the glass. We have found that by means of the said acids of arsenic and antimony the coating of luminescent bodies may be obtained in a more reliable way, because the said acids are not hygroscopic and therefore do not take up water from the air which would impair the process.

The aforesaid binding layers of phosphoric acid, arsenic acid and antimonic acid may also be used for applying several layers of luminous substances to the glass. We have found that a plurality of superposed layers of luminous substances of high inner strength, and effective luminescence and stability of the layer as against the action of the electrical discharge is obtained when the luminous bodies successively applied to the glass have a size of grain which gradually increases from the glass surfaces outwardly and when each layer of luminous bodies is bound respectively to the layer located below the same and to the glass, that is the wall of the tube or the screen, by means of a binding coating which consists of an acid of an element of the fifth group of the periodic system, for example of a layer of phosphoric acid, arsensic acid or antimonic acid. The lowermost luminous bodies which are next to the surface of the glass, and which consist of fine grains of luminous material assist the binding of the superposed layers of luminous bodies in which the grains are less fine, because the said first named fine grains of luminous bodies cause a roughing of the surface of the glass, and in a similar way each layer of luminous bodies produces a comparatively rough surface for the superposed layer. Thus the light rays first impinge upon the largest grains of luminous material, which is important because large bodies of luminous mass are in a less degree affected by the discharge than bodies of small grain, and because ordinarily grains of larger size more effectively transform the rays impinging thereon into luminescent light. Each of the intermediate layers of phosphoric acid, arsenic acid or antimonic acid solidifies at ordinary temperature or at elevated temperature under chemical reaction with the luminous grains and the glass into a transparent mass. Thereby all the layers of luminous bodies are bound to one another and also to the body of glass. By reason of the adherence of the individual layers the whole coating may have a high thickness without causing the other grains to break off, which causes further increase of the light efficiency.

A luminous coating which consists of several layers may be manufactured substantially as follows:

On a body of glass 1, such for example as the inner wall of a discharge lamp containing noble gas and mercury, a thin layer of phosphoric acid, arsenic acid, or antimonic acid dissolved in aceton is spread, a 5% solution of phosphoric acid in aceton being preferred. On the said coating of phosphoric acid a layer 6 of zinc silicate is applied in which the diameter of the grains is from 1 to 10$\mu$. The layer of phosphoric acid is dried, if desired at elevated temperature, and thereafter a second layer 7 of phosphoric acid is applied to the layer 6 of zinc silicate, the said layer preferably consisting of a 0.1 to 0.5% solution of phosphoric acid in aceton. To the said second layer of phosphoric acid a second layer 8 of zinc silicate is applied in which the grains have a diameter of from 10 to 40$\mu$. The second layer 7 of phosphoric acid is exceedingly thin, and therefore the wavy or irregular surface of the first layer 6 of zinc silicate is maintained, so that the grains of the second layer 8 of zinc silicate may fill out the depressions produced in the first layer 6 of zinc silicate, and the said grains of the second layer reliably stick to the first layer of zinc silicate and to the exceedingly thin layer 7 of phosphoric acid. After the second layer 7 of phosphoric acid has dried a third layer of zinc silicate may be applied in a similar way, the grains of which have a diameter of from 40 to 80$\mu$, an exceedingly thin coating 9 of phosphoric acid being first applied to the second layer 8 of zinc silicate. The number of the layers of zinc silicate and phosphoric acid which are successively applied depends on the character and intensity of the rays intended to impinge upon the said layers. By constructing the coating from layers in which the size of the grains is different a structure is obtained which is continuous and which has no free spaces, as distinguished from layers in which grains of varying size are irregularly applied. Thus the transformation of the impinging rays into visible or luminescent rays is assisted.

In the foregoing reference has been made to zinc silicate as a luminescent mass adapted to transform invisible rays into visible rays. But we wish it to be understood that any other luminescent mass may be used, such for example as cadmium silicate, zinc sulfide, calcium tungstate or magnesium tungstate. In a similar way in lieu of the phosphoric acid another acid of an element of the fifth group of the periodic system, and more particularly arsenic acid and antimonic acid may be used.

The colour of the luminescence, and also the efficiency of the transformation of the invisible rays into visible rays may be improved by combining different luminous bodies in the coating of the glass, the said luminous bodies being likewise applied in the form of grains of different sizes. For example we may use a zinc silicate having green luminescence or yellow luminescence in one layer, and a calcium tungstate having blue luminescence in the second layer, the intermediate or binding layers consisting of phosphoric acid, arsenic acid or antimonic acid. Further, several layers of zinc silicate having grains of different size and one or more layers of calcium tungstate may be superposed together with intermediate or binding layers of phosphoric acid, arsenic acid or antimonic acid, and in a similar way we may combine more than two, for example three superposed layers all having luminous bodies of different luminescence. If the luminous bodies are such that luminescence is excited by light rays of different wave lengths, the layers must be superposed so that the luminous body which is adapted to be excited by rays of short wave length is first impinged upon by the rays of the source of light such as a mercury vapour discharge.

The coating which is composed of several superposed layers may be further protected against the action of the discharge by applying a protective coating 11 of phosphoric acid, arsenic acid, or antimonic acid to the layer of luminous bodies, viz. to the layer 10 shown in Fig. 3, and the protective action may be further improved by applying a coating 12 of powdered quartz to the aforesaid protective layer 11, which powdered quartz does not reduce the efficiency of the transformation of the invisible rays into visible rays, because the quartz is permeable to ultra-violet rays.

The wall of the tube may consist of a coloured glass which is adapted to absorb undesired rays.

In the foregoing description the term luminous mass is understood to describe any substance which is adapted to transform light rays and more particularly invisible light rays, impinging thereon into visible light rays of greater wave length, the said term including substances the emission of light of which ceases when the excitaton of light rays ceases, and such substances the emission of light of which continues after the excitation by the said light rays has ceased.

We claim:

1. The herein described process of manufacturing luminescent bodies, which consists in applying a solution of an acid of an element of the fifth group of the periodic system, and a luminous substance to the surface of a glass body, and allowing the said solution to dry and to enter into chemical reaction with the glass and to form therewith a binding layer of the character of cement.

2. The process as claimed in claim 1, in which the acid is first applied to the surface of the glass, and the luminous mass is spread thereon in the form of a powder before the said acid has dried.

3. The process as claimed in claim 1, in which the body of glass is heated or accelerating drying and chemical reaction of the luminous mass.

4. The process as claimed in claim 1, in which phosphoric acid is applied to the body of glass.

5. The process as claimed in claim 1, in which to the solution of acid a substance is added which is adapted to reduce the chemical action of the acid on the luminous substance.

6. The method as claimed in claim 1, in which phosphoric acid is applied to the surface of the glass body together with a substance adapted to reduce the chemical action of the said phosphoric acid on the luminous body.

7. The method as claimed in claim 1, in which a solution of phosphoric acid containing zinc oxide is applied to the surface of the body of glass.

8. The method as claimed in claim 1, in which phosphoric acid and kaolin are applied to the body of glass.

9. The method as claimed in claim 1, in which the acid applied to the body of glass in arsenic acid.

10. The method as claimed in claim 1, in which the acid applied to the body of glass is antimonic acid.

11. A luminescent body consisting of a body of glass, a luminous substance and a material binding said substance to said glass, said material consisting of the product of the reaction between a solution of an acid of an element of the fifth group of the periodic system and said glass body.

12. A luminescent body as claimed in claim 11, in which the acid is phosphoric acid.

13. A luminescent body as claimed in claim 11, in which the acid is arsenic acid.

14. A luminescent body as claimed in claim 11, in which the acid is antimonic acid.

15. A luminescent body comprising a body of glass, and a plurality of layers each consisting of a binding medium and a luminous substance applied to the said glass body, the binding medium consisting of the product resulting from the reaction between a solution of an acid of an element of the fifth group of the periodic system, the glass and the luminous substance.

16. A luminescent body as claimed in claim 15, in which the size of the grains of the luminous mass in the superposed layers is gradually increased from the base of glass outwardly.

17. A luminescent body as claimed in claim 16, in which the luminous substances in the superposed layers are different in character.

18. A luminescent body as claimed in claim 11, in which the luminous mass has a protective coating of said product.

19. A luminescent body as claimed in claim 11, in which the luminous mass has a protective coating of an acid of an element of the fifth group of the periodic system and powdered quartz applied thereto.

20. An electric discharge device comprising a container the wall of which consists of colored and transparent material, said wall having an internal coating consisting of the product of the reaction between said container material and a solution of an acid of an element of the fifth group of the periodic system and a luminous body on said coating, and electrodes within said container, said container having a filling of gas permitting electric discharge between said electrodes.

WALTHER DAWIHL.
OTTO FRITZE.
ALFRED RÜTTENAUER.